UNITED STATES PATENT OFFICE.

FRIEDRICH VALENTINER, OF LEIPSIC-PLAGWITZ, GERMANY.

PROCESS OF MAKING ACETOPHENONPHENETIDID.

SPECIFICATION forming part of Letters Patent No. 629,099, dated July 18, 1899.

Application filed April 15, 1898. Serial No. 677,759. (No specimens.)

*To all whom it may concern:*

Be it known that I, FRIEDRICH VALENTINER, a subject of the King of Saxony, residing at Leipsic-Plagwitz, in the Kingdom of Saxony, Germany, have invented certain new and useful Improvements in Processes for the Reduction of Acetophenonphenetidid in Vacuum, (for which I have applied for a patent in Germany November 26, 1897,) of which the following is a specification.

My invention relates to an improved process for the production of acetophenonphenetidid in vacuum, the rational formula of such substance being as follows:

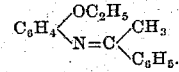

The process already known for the production of acetophenonphenetidid is based upon the condensation of acetophenone and paraphenetidin with the aid of heat. The temperature at which this reaction takes place is from 135° to 140° centigrade—that is, at a temperature at which the paraphenetidine decomposes in the presence of air and consequently causes various discolorations. One of the greatest difficulties which has to be overcome in carrying out the above-mentioned process is to avoid these decompositions. After the product of the reaction has been cooled the crystallization of the acetophenonphenetidid takes place from the mother liquor. The wet crystals are then placed upon a suction filter apparatus in order to remove the remaining mother liquor and subsequently washed with alcohol for a prolonged time. In spite of this complicated and vigorous purification it is still only possible to obtain the acetophenonphenetidid in the state of purity by means of repeated recrystallization from alcohol, ether, or chloroform. From the mother liquors drawn off the acetophenone which had not taken part in the reaction can be recovered for the most part, but the paraphenetidin, on the other hand, cannot be recovered.

The following description sets forth a process for the production of acetophenonphenetidid in vacuum, which prevents any production of semifluid impurities and which produces by means of a single short operation perfectly-pure acetophenonphenetidid and at the same time gives back the compounds which have not entered into the reaction in an almost chemically-pure condition.

My new process is conducted as follows: One-half kilogram of acetophenone is heated in an exhausted retort with one thirty-seventh of a kilogram of paraphenetidin until there commences a vigorous separation of water. After this the temperature is allowed to rise gradually and the whole contents of the retort fractionally distilled off in vacuum. Acetophenone and paraphenetidin are collected separately and can be immediately used over again for a fresh charge. At the temperature of 210° to 212° centigrade and an atmospheric pressure of seventy-two millimeters the acetophenonphenetidid distils and condenses to a pale-yellow oil, which on cooling solidifies into beautiful clear crystals. A single washing with alcohol renders the product chemically pure.

The reaction takes place according to the following equation:

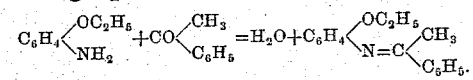

The technical advantage of this process as compared with the previous one is obvious. The manufacture of the pure product of the condensation which previously required about a week to prepare each charge can be effected by my new process with the simplest apparatus in four to five hours. The product is of unimpeachable purity, and the yield is raised from sixty per cent. to about ninety per cent., and finally the recovered materials which have not entered into combination are practically pure.

What I claim, and desire to secure by Letters Patent of the United States, is—

The improved process for the production of acetophenonphenetidid which consists in heating acetophenone and paraphenetidin in molecular proportions in a vacuum to the combination temperature and distilling off therefrom in vacuum the acetophenonphenetidid produced.

In testimony whereof I have hereunto set my hand in the presence of two witnesses.

FRIEDRICH VALENTINER.

Witnesses:
 RUDOLPH FRICKE,
 B. H. WARNER, Jr.